(12) United States Patent
Grieves et al.

(10) Patent No.: US 9,809,005 B2
(45) Date of Patent: Nov. 7, 2017

(54) ANTI-BALLISTIC MATERIALS AND SYSTEM

(71) Applicant: ANTIBALLISTIC SECURITY AND PROTECTION, INC., Easton, MD (US)

(72) Inventors: Richard Grieves, Easton, MD (US); Gilbert Meyer, Richboro, PA (US); Leif Lundkvist, Royal Oak, MD (US)

(73) Assignee: Antiballistic Security and Protection, Inc., Easton, MD (US)

( * ) Notice: Subject to any disclaimer, the term of this patent is extended or adjusted under 35 U.S.C. 154(b) by 0 days.

(21) Appl. No.: 14/875,338

(22) Filed: Oct. 5, 2015

(65) Prior Publication Data

US 2016/0102471 A1 Apr. 14, 2016

Related U.S. Application Data

(60) Provisional application No. 62/059,502, filed on Oct. 3, 2014.

(51) Int. Cl.
*B32B 9/00* (2006.01)
*F41H 9/04* (2006.01)
(Continued)

(52) U.S. Cl.
CPC .............. *B32B 9/045* (2013.01); *B32B 9/002* (2013.01); *B32B 9/04* (2013.01); *B32B 9/041* (2013.01);
(Continued)

(58) Field of Classification Search
CPC ....... B32B 15/20; B32B 15/08; B32B 15/082; B32B 27/03; B32B 27/306; B32B 9/00;
(Continued)

(56) References Cited

U.S. PATENT DOCUMENTS 4,061,815 A * 12/1977 Poole, Jr. .............. F41H 5/0414
89/36.02
4,623,574 A * 11/1986 Harpell ................. F41H 5/0485
428/113
(Continued)

FOREIGN PATENT DOCUMENTS

DE 102009018802 A1 * 11/2009 ........... F41H 5/0428
PT 104855 A * 6/2011 ........... F41H 5/0442
(Continued)

OTHER PUBLICATIONS

"US data table for plastics". Signal Processing SA. Archived Jan. 20, 2012. web.archive.org/web/20120120233100/http://www.signalprocessing.com/us_data_p.html.*
(Continued)

*Primary Examiner* — Maria Veronica Ewald
*Assistant Examiner* — Ethan A Utt
(74) *Attorney, Agent, or Firm* — Pepper Hamilton LLP

(57) ABSTRACT

Anti-ballistic systems and methods for making same are described. The anti-ballistic systems may be formed from various materials arranged in a structure, such as a wall structure. For example, an anti-ballistic system may be formed from a metal material, a polymer material, and a stone material. In some embodiments, the metal material may include aluminum (for example, an aluminum composite panel), the polymer material may include ethylene vinyl acetate, and the stone material may include granite. The anti-ballistic wall systems may be configured to be resistant to ballistics, blasts, and/or forced entry.

13 Claims, 3 Drawing Sheets

(51) Int. Cl.
*B32B 15/20* (2006.01)
*B32B 15/18* (2006.01)
*B32B 27/30* (2006.01)
*E04H 9/04* (2006.01)
*B32B 9/04* (2006.01)
*F41H 5/04* (2006.01)
*B32B 15/04* (2006.01)
*B32B 15/08* (2006.01)
*B32B 27/08* (2006.01)
*B32B 27/32* (2006.01)
*B32B 15/082* (2006.01)
*E04F 13/08* (2006.01)
*E04H 9/06* (2006.01)
*E04H 9/10* (2006.01)

(52) U.S. Cl.
CPC ............ *B32B 15/043* (2013.01); *B32B 15/08* (2013.01); *B32B 15/18* (2013.01); *B32B 27/08* (2013.01); *B32B 27/32* (2013.01); *F41H 5/0457* (2013.01); *B32B 15/082* (2013.01); *B32B 15/20* (2013.01); *B32B 27/306* (2013.01); *B32B 2307/558* (2013.01); *B32B 2571/02* (2013.01); *E04F 13/0866* (2013.01); *E04H 9/06* (2013.01); *E04H 9/10* (2013.01)

(58) Field of Classification Search
CPC .. B32B 9/002; B32B 7/02; B32B 7/12; B32B 7/00; B32B 15/085; B32B 15/01; B32B 15/016; Y10T 428/31678–428/31717; Y10T 428/24942–428/24992; Y10T 428/12736; Y10T 428/12764; F41H 5/04; F41H 5/0442; F41H 5/0457; F41H 5/0464; E04H 9/04–9/12; E04F 13/075; E04F 13/077; E04F 13/08; E04F 13/0866
USPC .............. 428/457–472.3, 212–220, 650, 654
See application file for complete search history.

(56) References Cited

U.S. PATENT DOCUMENTS

| | | | | |
|---|---|---|---|---|
| 4,739,709 A | * | 4/1988 | Zimmerschied | F42B 12/22 |
| | | | | 428/626 |
| 4,768,418 A | * | 9/1988 | Blommer | F42B 39/24 |
| | | | | 89/36.02 |
| 4,934,245 A | * | 6/1990 | Musante | F41H 5/04 |
| | | | | 428/911 |
| 5,157,223 A | * | 10/1992 | Wheeler | F42B 39/24 |
| | | | | 102/705 |
| 5,480,706 A | | 1/1996 | Li et al. | |
| 7,520,205 B1 | * | 4/2009 | Colliflower | F41H 5/0421 |
| | | | | 89/36.02 |
| 8,592,023 B2 | | 11/2013 | Es Van et al. | |
| 8,739,675 B2 | | 6/2014 | Tunis et al. | |
| 2007/0207301 A1 | * | 9/2007 | Hanks | B32B 15/20 |
| | | | | 428/292.1 |
| 2008/0012169 A1 | | 1/2008 | Solomon et al. | |
| 2009/0120273 A1 | | 5/2009 | Eckdahl et al. | |
| 2009/0169855 A1 | | 7/2009 | Tunis | |
| 2010/0003452 A1 | | 1/2010 | Jongedijk et al. | |
| 2011/0203452 A1 | | 8/2011 | Kucherov et al. | |
| 2011/0239851 A1 | * | 10/2011 | Mason | F41H 5/0457 |
| | | | | 89/36.02 |
| 2014/0186561 A1 | | 7/2014 | Bhattacharya et al. | |
| 2014/0290474 A1 | | 10/2014 | Citterio et al. | |

FOREIGN PATENT DOCUMENTS

| | | | | |
|---|---|---|---|---|
| WO | WO 2008098990 A1 | * | 8/2008 | ........... F41H 5/0442 |
| WO | WO2008105889 A2 | | 9/2008 | |

OTHER PUBLICATIONS

"US data table for solids". Signal Processing SA. Archived Jan. 20, 2012. web.archive.org/web/20120120233219/http://www.signalprocessing.com/us_data_s.htm.*
Boljanovic, Vukota. (2007). Applied Mathematical and Physical Formulas—Pocket Reference—17.13 Speed of Sound in Air. (pp. 340-348). Industrial Press. Online version available at: app.knovel.com/hotlink/pdf/id:kt008X3SNE/applied-mathematical/speed-sound-in-air.*
Wypych, George. (2012). Handbook of Polymers—EVAC ethylene-vinyl acetate copolymer. (pp. 128-131). ChemTec Publishing. Online version available at: app.knovel.com/hotlink/pdf/id:kt00A21S51/handbook-of-polymers/evac-ethylene-vinyl-acetate.*
Machine translation (Espacenet) of WO 2008/098990 A1. Translated Mar. 2, 2016.*
Machine translation (Espacenet) of DE 10 2009 018 802 A1. Translated Aug. 26, 2016.*
Machine translation (Espacenet) of PT 104855 A. Translated Aug. 26, 2016.*
International Search Report and Written Opinion for PCT/US15/53958 dated Mar. 3, 2016.
International Search Report and Written Opinion for PCT/US2015/053958 dated Mar. 3, 2016.

* cited by examiner

ANTI-BALLISTIC MATERIALS AND SYSTEM

CROSS-REFERENCE TO RELATED APPLICATIONS

This application claims the priority benefit of U.S. Provisional Application No. 62/059,502 entitled "Anti-Ballistic Materials and Wall System" and filed Oct. 3, 2014, the contents of which are hereby incorporated by reference in their entirety.

BACKGROUND

Anti-ballistic materials and barriers are generally classified according to their ability to withstand impacts by projectiles. The industry standard classifications are based on the Underwriters Laboratory (UL) bullet-resistant standards, which range from a UL1 rating to a UL8 rating. A UL8 rating requires that a barrier be able to withstand five rounds of 7.62 mm lead core full metal copper jacket ammunition military balls at a velocity of 838 meters per second (MPS). Typical barriers that meet the UL8 standard are formed from multiple components or "layers" of various materials. In particular, conventional UL8-rated barriers have been formed from thick layers of dense, heavy materials that increase the cost to manufacture and install. In addition, such materials limit the types of structures that can be formed and/or protected because of the thickness and weight of the materials. Accordingly, the anti-ballistics industry would benefit from a barrier system formed from cost-efficient materials capable of forming a UL8-rated barrier in a lighter, smaller form and with decreased installation costs.

BRIEF DESCRIPTION OF THE DRAWINGS

The above and other objects of the present invention will become more readily apparent from the following detailed description taken in connection with the accompanying drawings.

SUMMARY

Figure 1:
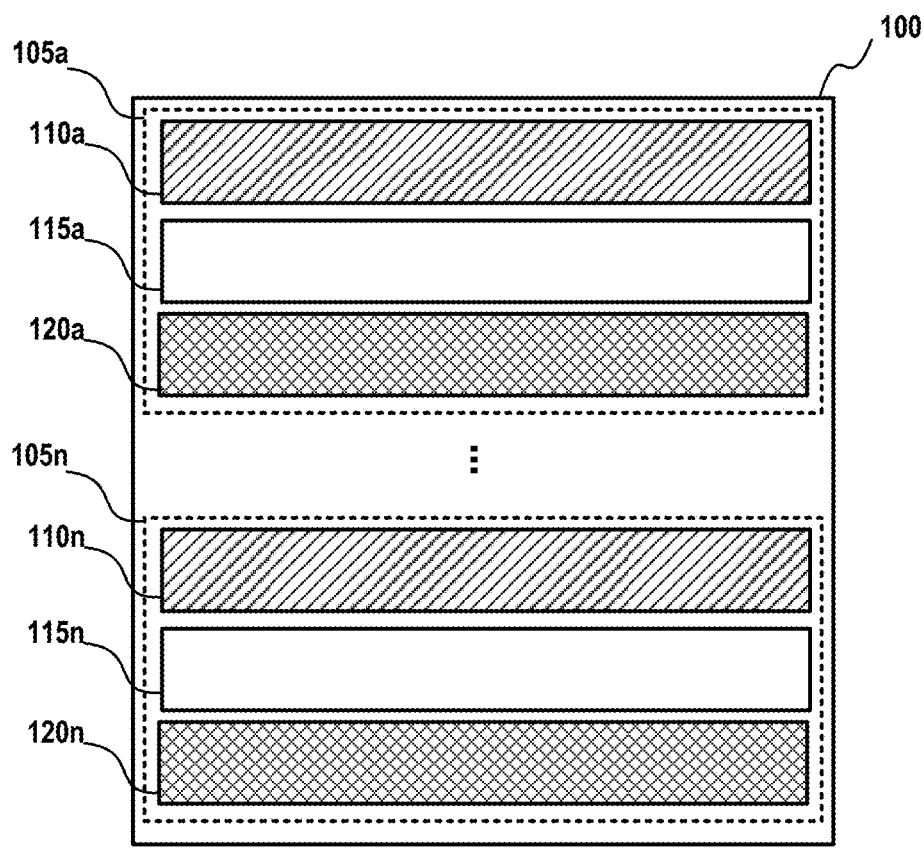
FIG. 1 depicts an illustrative anti-ballistic system according to a first embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an anti-ballistic system may include a plurality of layers that include at least one aluminum material layer, at least one ethylene vinyl acetate material layer, and at least one granite material layer.

In an embodiment, an anti-ballistic system may include a plurality of layers that include at least one metal material layer, at least one polymer material layer, and at least one stone material layer.

In an embodiment, a method of making an anti-ballistic system may include providing a plurality of layers that include at least one aluminum material layer, at least one ethylene vinyl acetate material layer, and at least one granite material layer.

DETAILED DESCRIPTION

The present disclosure generally relates to materials systems configured to provide protection from projectiles, blasts, forced entry, and other ballistic events ("anti-ballistic" or "ballistic resistant"). The anti-ballistic system may be formed from various materials including, without limitation, metals, metal alloys, stone materials, polymer materials, fiber or fabric materials (for instance, para-aramid fibers such as Kevlar® provided by E. I. du Pont de Nemours and Company of Wilmington, Del., United States), polycarbonate, and/or combinations thereof. In some embodiments, a metal alloy material may include steel or steel alloys (ST). Non-limiting examples of materials may include aluminum (AL), granite (GR), ethylene vinyl acetate (EVA), polyethylene (PE), composites thereof, derivatives thereof, and/or any combinations thereof.

In some embodiments, the anti-ballistic systems may be formed as anti-ballistic wall structures (or other architectural or structural components) configured to be used as a building material to construct a structure, such as a building and/or a room (for instance, a "safe room") within a building and/or to impart anti-ballistic properties to the structure. For example, a ballistic wall system may be used as an exterior wall of a building, fence, barricade, roof, door, and/or other structure. In some embodiments, a ballistic wall system may be used in a manner similar to drywall. In some embodiments, a ballistic wall system may be used to form exterior barricades. In some embodiments, the anti-ballistic systems may be configured to be installed on an existing structure, such as the exterior surface of a building, to impart anti-ballistic properties thereto. In a non-limiting example, the anti-ballistic systems may be mounted on the existing walls of a shooting range to provide anti-ballistic (or "anti-ricochet") properties to the areas of the shooting range where ammunition is fired.

FIG. 1 depicts an illustrative anti-ballistic system according to some embodiments. As shown in FIG. 1, an anti-ballistic system 100 may include one or more layers 105a-n. Each layer 105a-n may include one or more materials 110a-n, 115a-n, 120a-n configured to form a sub-layer alone or in combination with other materials. The materials 110a-n, 115a-n, 120a-n may include, without limitation, metals, metal alloys, metal composites, polymers, stone materials, fibrous materials, and combinations thereof. In some embodiments, a material 110a-n may include an AL material. In some embodiments, the AL material may include an aluminum composite material, such as a composite panel formed from PE arranged between two AL layers forming an aluminum composite panel (ACP). In some embodiments, the ACP may be configured to deform up to 40 mm. In some embodiments, THE material 115a-n may include a stone material, such as GR. In some embodiments, a stone material may be provided as a solid piece, a plurality of solid pieces, or a plurality of tiles. In some embodiments, a material 120a-n may include a polymer or co-polymer material, such as EVA. In some embodiments, an EVA material may be configured to provide softening back pressure to adjacent materials impacted by a projectile, such as ACP and/or GR materials. Each material 110a-n, 115a-n, 120a-n may be affixed to an adjacent material using various methods and/or materials. In some embodiments, each material 110a-n, 115a-n, 120a-n may be affixed to an adjacent material using fasteners and/or an adhesive or other bonding material.

Each material 110a-n, 115a-n, 120a-n may be included in various thicknesses. For instance, a metal material 110a-n may include an ACP that is about 4 millimeters (mm) thick that is formed from two aluminum layers each about 0.4 mm thick and a PE core about 3.2 mm thick. In some embodiments, a metal material 110a-n, for example an aluminum material, may have a thickness of about 1 mm, about 2 mm, about 3 mm, about 4 mm, about 5 mm, about 7 mm, about 10 mm, about 15 mm, about 20 mm, about 1 mm to about 20 mm, about 1 mm to about 4 mm, about 1 mm to about 10 mm, about 2 mm to about 4 mm, about 3 mm to about 5 mm, about 4 mm to about 10 mm, about 5 mm to about 20 mm, or any value or range between any two of these values or ranges (including endpoints). In an embodiment in which the metal material 110a-n is formed as an ACP, each of the aluminum layers of the ACP may have a thickness of about 0.1 mm, about 0.2 mm, about 0.3 mm, about 0.4 mm, about 0.5 mm, about 0.7 mm, about 1.0 mm, about 1.5 mm, about 2.0 mm, about 0.1 mm to about 2.0 mm, about 0.1 mm to about 0.4 mm, about 0.1 mm to about 1.0 mm, about 0.2 mm to about 0.4 mm, about 0.4 mm to about 1.0 mm, about 0.5 mm to about 2.0 mm, or any value or range between any two of these values or ranges (including endpoints). In an embodiment in which the metal material 110a-n is formed as an ACP, the PE core of the ACP may have a thickness of about 0.5 mm, about 1 mm, about 2 mm, about 3 mm, about 4 mm, about 5 mm, about 6 mm, about 7 mm, about 8 mm, about 9 mm to about 10 mm, about 15 mm to about 20 mm, about 0.5 mm to about 5 mm, about 1 mm to about 10 mm, about 0.5 mm to about 20 mm, about 3 mm to about 4 mm, or any value or range between any two of these values or ranges (including endpoints).

In some embodiments, a stone material 115a-n, for example a granite material, may have a thickness of about 10 mm, about 13 mm, about 15 mm, about 18 mm, about 20 mm, about 25 mm, about 30 mm, about 50 mm, about 100 mm, about 500 mm, about 1 centimeter (cm), about 5 cm, about 10 cm, about 20 cm, about 10 mm to about 15 mm, about 10 mm to about 20 mm, about 10 mm to about 13 mm, about 10 mm to about 50 mm, about 13 mm to about 20 mm, about 20 mm to about 100 mm, about 100 mm to about 1 cm, about 100 mm to about 10 cm, about 500 mm to about 10 cm, about 1 cm to about 5 cm, about 1 cm to about 10 cm, about 5 cm to about 10 cm, about 1 cm to about 20 cm, about 5 cm to about 20 cm, about 10 cm to about 20 cm, or any value or range between any two of these values or ranges (including endpoints).

In some embodiments, a polymer material 120a-n, for example an ethylene vinyl acetate material, may have a thickness of about 1 mm, about 5 mm, about 8 mm, about 10 mm, about 12 mm, about 15 mm, about 20 mm, about 25 mm, about 30 mm, about 50 mm, about 100 mm, about 500 mm, about 1 cm, about 2 cm, about 5 cm, about 10 cm, about 1 mm to about 10 cm, about 5 mm to about 15 mm, about 8 mm to about 12 mm, about 10 mm to about 15 mm, about 20 mm to about 100 mm, about 10 mm to about 500 mm, about 100 mm to about 1 cm, about 100 mm to about 10 cm, about 500 mm to about 10 cm, about 1 cm to about 5 cm, about 1 cm to about 10 cm, about 5 cm to about 10 cm, or any value or range between any two of these values or ranges (including endpoints).

In some embodiments, the anti-ballistic system 100 may include 1 layer 105a-n, 2 layers, 3 layers, 4 layers, 5 layers, 6 layers, 7 layers, 8 layers, 9 layers, 10 layers, 15 layers, 20 layers, 25 layers, 1 layer to 25 layers, 1 layer to 5 layers, 1 layer to 10 layers, 2 layers to 5 layers, 2 layers to 10 layers, 3 layers to 5 layers, 3 layers to 10 layers, 5 layers to 10 layers, 5 layers to 20 layers, 3 layers to 25 layers, 10 layers to 15 layers, 10 layers to 25 layers, 20 layers to 25 layers, or any value or range between any two of these values or ranges (including endpoints).

Each layer 105a-n may include one or more materials 110a-n, 115a-n, 120a-n in various combinations. In some embodiments, one or more layers 105a-n may include different types, thicknesses, and/or arrangements (for instance, an ordering) of the materials 110a-n, 115a-n, 120a-n according to some embodiments. In a first non-limiting example, a layer 105a may include one or more of ACP 110a, one or more of GR 115a, and one or more of EVA 120a. In a second non-limiting example, a layer 105a may include one or more of ACP 110a and one or more of EVA 120a. In a third non-limiting example, a layer 105a may include one or more of ACP 110a. The materials, the numbers of sub-layers of materials, and the ordering thereof in the various types of layers 105a-n may be arranged in various combinations.

In some embodiments, various other materials may be included on or between the layers 105a-n and/or materials 110a-n, 115a-n, 120a-n thereof. Non limiting examples of such various other materials may include metals, metal alloys (for example, ST), stone materials, polymer materials, fiber or fabric materials (for instance, para-aramid fibers such as Kevlar®), polycarbonate, and/or combinations thereof. In some embodiments, the layers 105a-n may consist only of metal, polymer, and stone materials. In some embodiments, the layers 105a-n may consist only of AL, EVA, and GR materials. In some embodiments, the layers 105a-n may consist only of AL, EVA, ST, and GR materials.

Embodiments are not limited to the materials described herein, such as AL, ACP, EVA, and/or GR, as other materials may be used in substitution thereof and/or in combination therewith. For example, other hard stone or stone-like materials may be used in combination with or in the place of GR, such as other hard natural stones, concrete, or the like. In another example, other metals may be used in combination with or in the place of AL. In a further example, other polymer materials may be used in combination with or in substitution of PE and/or EVA. In addition, one or more of the materials and/or portions of an anti-ballistic system may be coated, covered, and/or finished using various materials. Non-limiting examples of coating materials may include polymer materials, polyvinylidene fluoride (PVDF), paint materials, plaster, gypsum plaster, and/or any combination thereof.

Figure 2:
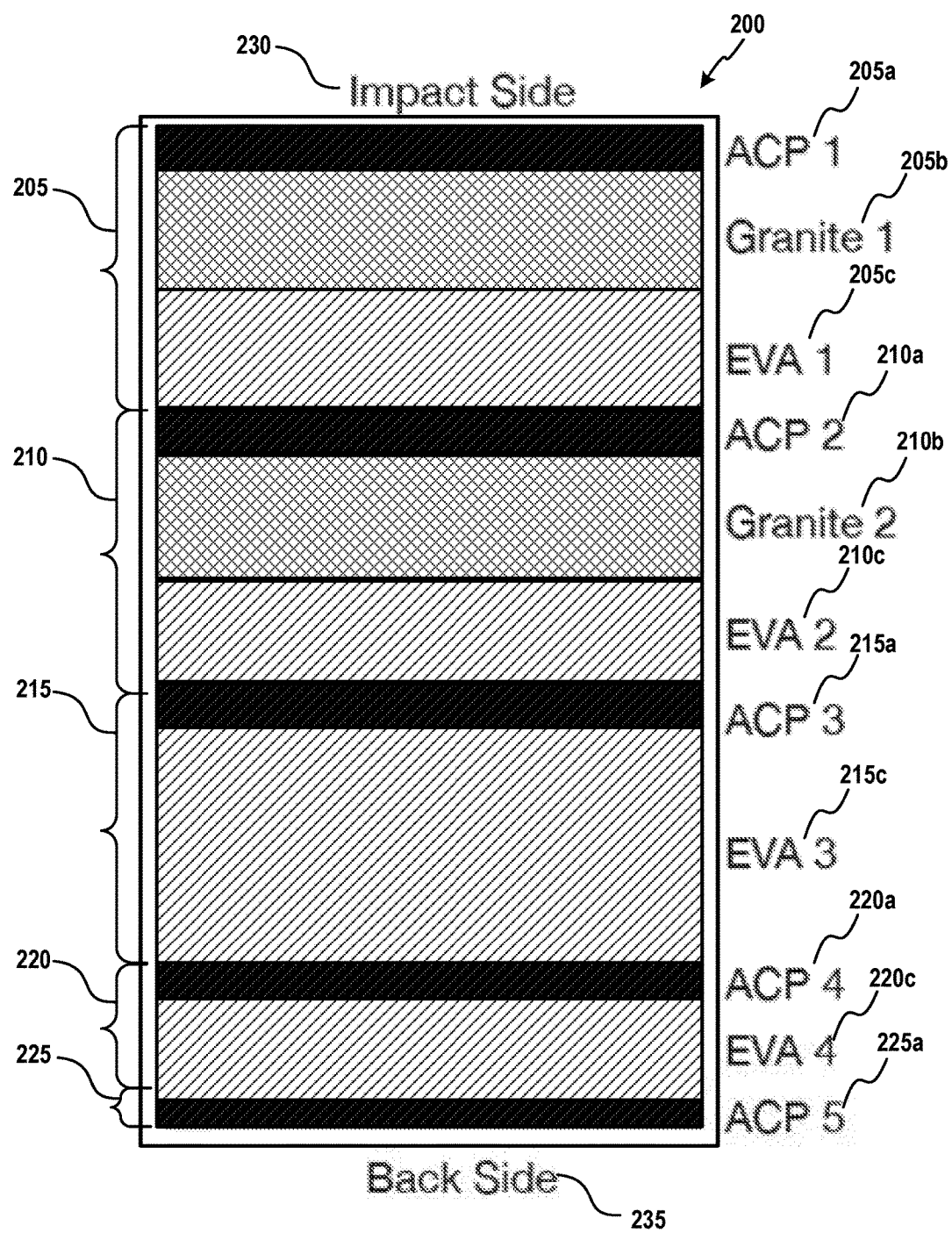
FIG. 2 depicts an illustrative anti-ballistic system according to a second embodiment.

FIG. 2 depicts an illustrative anti-ballistic system according to a second embodiment. As shown in FIG. 2, an anti-ballistic system 200 may be configured to have an impact side 230 and a back side (or non-impact side) 235. The impact side 230 may be configured to face outward (for example, toward the exterior of a building and/or toward an area expected to receive an impact, blast, or the like) to receive an initial impact from a projectile, a blast, or other ballistic event. In some embodiments, two anti-ballistic systems 200 may be arranged with their non-impact sides 235 facing each other to form a system with impact sides 230 facing out in both directions. In some embodiments, four anti-ballistic systems 200 may be arranged in a box or cube formation with four walls with the impact side 230 of each system facing outward to form an antiballistic box, column, room, or the like.

The anti-ballistic system 200 may include a plurality of layers 205-225 formed from various materials or sub-layers ("layers"). A first layer 205 may include a first ACP layer 205a, a first GR layer 205b, and a first EVA layer 205c. A second layer 210 may include a second ACP layer 210a, a second GR layer 210b, and a second EVA layer 210c. A third layer 215 may include a third ACP layer 215a and a third EVA layer 215c. A fourth layer 220 may include a fourth ACP layer 220a and a fourth EVA layer 220c. A fifth layer 225 may include a fifth ACP layer 225a. In some embodiments, one or more of the GR layers 205b, 210b may be affixed, such as through an adhesive and/or fasteners, to an adjacent ACP layer 205a, 210a.

Each layer 205-225 and the materials thereof may operate to provide anti-ballistic properties to the anti-ballistic system 200. For instance, as a projectile hits GR layer 205b, the tip of the projectile (for instance, a round of ammunition) may be flattened and the projectile may be broken into smaller pieces. The breakup of GR layer 205b may operate to remove kinetic energy from the projectile. EVA layer 205c may act as a shock absorber, for instance, to protect GR layer 205b from being split into pieces. The second layer 210 may operate to increase the protection level of the wall. The combination of ACP layers 215a, 220a and EVA layers 215c, 220c in layers 215 and 220 may operate to "catch" and slow the projectile and granite fragments to an eventual stop before penetrating the back side 235. Layers 205 and 210 may be configured as "impact layers" configured to receive and diminish (including completely eliminate) the energy of an impact of a projectile, blast, or other ballistic event. Layers 215-225 may be "fragment catching layers" configured to receive and diminish the movement of fragments, such as projectile fragments and pieces of other layers within the anti-ballistic system 200, such as fragments of impact layers 205 and 210.

Figure 3A:
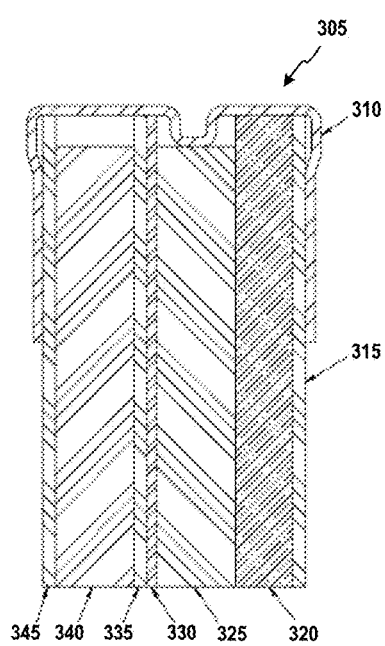
FIGS. 3A and 3B depict an illustrative anti-ballistic system according to a third embodiment.
Figure 3B:
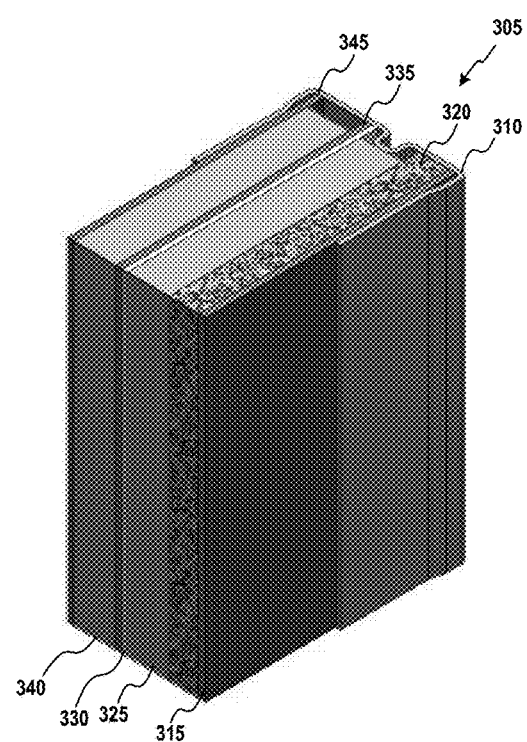

FIGS. 3A and 3B depict an illustrative anti-ballistic system according to some embodiments. FIG. 3A depicts a side view of a portion of an anti-ballistic system 305 that includes multiple layers 315-345 arranged within a frame 310 (or "frame profile"). The frame 310 may be formed from various materials including, without limitation, a metal, a metal alloy, a polymer material, and/or any combination thereof. In some embodiments, the frame 310 may be formed from ST, such as cold rolled steel. In some embodiments, the frame 310 may be configured to support or otherwise hold the layers in place and/or to operate as a structure for connecting multiple anti-ballistic systems 305 together. In some embodiments, the frame 310 may not provide ballistic, blast, and/or forced entry characteristics to the anti-ballistic system 305. In some embodiments, the view depicted in FIGS. 3A and 3B may include a portion of the anti-ballistic system 305 formed as a wall structure (similar to a sheet of drywall), such as an upper-corner of a wall structure. As shown in FIGS. 3A and 3B, the portion of the anti-ballistic system 305 may include a first ACP layer 315, a granite layer 320, a first EVA layer 325, a ST layer 330, a second ACP layer 335, a second EVA layer 340 and a third ACP layer 345.

The anti-ballistic systems (such as anti-ballistic systems 100, 200, and 305) described herein may be configured to be compliant with various ballistics, blast, and/or forced entry and bullet resistance standards. In some embodiments, anti-ballistic systems configured according to some embodiments may be UL8 compliant (for example, American National Standards Institute (ANSI)/UL-752 level 8) (for example, 5 rounds of .308 caliber military ball inside a 4.5 inch$^2$ area). For example, a UL8 test of anti-ballistic system 200 may result in no penetration or substantially no penetration of ACP layers 220a and 225a. In some embodiments, anti-ballistic systems configured according to some embodiments may be able to obtain a blast certification of 11 pounds per square inch (PSI) overpressure (for example, 11 PSI peak overpressure, 2200 pounds of trinitrotoluene (TNT) at 100 feet). In some embodiments, anti-ballistic systems configured according to some embodiments may be able to obtain a forced entry certification of 15 minutes (for example, 15 minute attacks on wall structure and seams, plus .308 caliber rounds). Accordingly, anti-ballistic systems described herein according to some embodiments may provide a cost-efficient UL8 wall system formed from standard, inexpensive building materials.

In some embodiments, the anti-ballistic system may be formed as a panel, for example, for use as a wall structure. In some embodiments, an anti-ballistic system wall structure may have a height of about 1.22 meters (about 4 feet), about 1.52 meters (about 5 feet), about 1.83 meters (about 6 feet), about 2.13 meters (about 7 feet), about 2.44 meters (about 8 feet), about 3.05 meters (about 10 feet), about 3.66 meters (about 12 feet), about 4.57 meters (about 15 feet), or any value or range between any two of these values or ranges (including endpoints). In some embodiments, an anti-ballistic system wall structure may have a width of about 0.31 meters (about 1 foot), about 0.61 meters (about 2 feet), about 0.91 meters (about 3 feet) about 1.22 meters (about 4 feet), about 1.52 meters (about 5 feet), about 1.82 meters (about 6 feet), about 2.13 meters (about 7 feet), about 2.44 meters (about 8 feet), about 3.05 meters (about 10 feet), or any value or range between any two of these values or ranges (including endpoints). In some embodiments, an anti-ballistic system wall structure may have a thickness of about 1.27 centimeters (about ½ inches), about 2.54 centimeters (about 1 inch), about 5.08 centimeters (about 2 inches), about 7.62 centimeters (about 3 inches), about 8.26 centimeters (about 3¼ inches), about 8.89 centimeters (about 3½ inches), about 9.53 centimeters (about 3¾ inches), about 10.16 centimeters (about 4 inches), about 12.70 centimeters (about 5 inches), about 25.4 centimeters (about 10 inches), or any value or range between any two of these values or ranges (including endpoints). In some embodiments, an anti-ballistic system wall structure may have a weight per area (or "weight") of about 48.8 kilograms per square meter (kg/m$^2$) (about 10 pounds per square foot (lbs/ft$^2$)), about 73.2 kg/m$^2$ (about 15 lbs/ft$^2$), about 87.9 kg/m$^2$ (about 18 lbs/ft$^2$), about 97.7 kg/m$^2$ (20 lbs/ft$^2$), or any value or range between any two of these values or ranges (including endpoints).

In some embodiments, an anti-ballistic system wall structure may include various elements for connecting and/or stacking anti-ballistic system wall structures to each other and/or to other building structures (for example, ceilings and/or existing walls). Non-limiting examples of such elements include sheer bars, I-beams, anchors, brackets, or the like.

EXAMPLES

Example 1

Illustrative Anti-Ballistic System Layers

In some embodiments, an anti-ballistic system may include one or more of the non-limiting illustrative layers as provided in the following Table 1 in one or more combinations:

TABLE 1

| | |
|---|---|
| Example Layer 1 | ACP |
| Example Layer 2 | GR |
| Example Layer 3 | EVA |
| Example Layer 4 | ACP |
| | ACP |
| Example Layer 5 | GR |
| | GR |
| Example Layer 6 | EVA |
| | EVA |
| Example Layer 7 | ACP |
| | GR |
| Example Layer 8 | GR |
| | ACP |
| Example Layer 9 | ACP |
| | EVA |
| Example Layer 10 | EVA |
| | ACP |
| Example Layer 11 | GR |
| | EVA |
| Example Layer 12 | EVA |
| | GR |
| Example Layer 13 | ACP |
| | EVA |
| | ACP |
| | GR |
| Example Layer 14 | GR |
| | ST |
| | GR |
| Example Layer 15 | EVA |
| | ACP |
| | EVA |
| | GR |
| | ST |
| Example Layer 16 | ACP |
| | GR |
| | EVA |
| Example Layer 17 | ACP |
| | EVA |
| | GR |
| Example Layer 18 | GR |
| | ACP |
| | EVA |
| Example Layer 19 | GR |
| | EVA |
| | ACP |
| Example Layer 20 | EVA |
| | GR |
| | ACP |
| Example Layer 21 | EVA |
| | ACP |
| | GR |
| Example Layer 22 | ACP |
| | GR |
| | EVA |
| | ACP |
| | EVA |
| | ACP |
| Example Layer 23 | ACP |
| | EVA |
| | ACP |
| | EVA |
| | GR |
| | ACP |
| Example Layer 24 | ACP |
| | GR |
| | EVA |

TABLE 1-continued

| | |
|---|---|
| | ACP |
| | GR |
| | EVA |
| | ACP |
| | EVA |
| | ACP |
| | EVA |
| | ACP |
| Example Layer 25 | EVA |
| | GR |
| | EVA |
| Example Layer 26 | ACP |
| | GR |
| | EVA |
| | GR |
| Example Layer 27 | EVA |
| | ACP |
| | EVA |
| | EVA |
| Example Layer 28 | GR |
| | GR |
| | EVA |
| | ACP |
| Example Layer 29 | GR |
| | GR |
| | GR |
| | GR |
| | EVA |
| Example Layer 30 | ACP |
| | GR |
| | ACP |
| | GR |
| Example Layer 31 | GR |
| | EVA |
| | GR |
| | EVA |
| Example Layer 32 | ACP |
| | EVA |
| | ACP |
| | EVA |
| Example Layer 33 | GR |
| | GR |
| | EVA |
| | ACP |
| | EVA |
| Example Layer 34 | ACP |
| | GR |
| | GR |
| | EVA |
| | ACP |
| Example Layer 35 | ACP |
| | GR |
| | EVA |
| | GR |
| | EVA |
| | ACP |
| Example Layer 36 | ACP |
| | GR |
| | GR |
| | EVA |
| | ACP |
| | GR |
| | GR |
| | EVA |
| Example Layer 37 | ACP |
| | GR |
| | EVA |
| | ACP |
| | GR |
| | EVA |
| | ACP |
| | GR |
| | EVA |
| | ACP |
| Example Layer 38 | ACP |
| | GR |
| | EVA |
| | ACP |
| Example Layer 39 | ACP |
| | GR |

TABLE 1-continued

|  |  |
|---|---|
|  | EVA |
|  | ACP |
|  | GR |
|  | EVA |
|  | ACP |
|  | ECA |
|  | ACP |
|  | EVA |
|  | ACP |
|  | ACP |
|  | EVA |
|  | ACP |
|  | EVA |
|  | ACP |
|  | EVA |
|  | GR |
|  | ACP |
|  | EVA |
|  | GR |
|  | ACP |
| Example Layer 40 | ST |
| Example Layer 41 | ST |
|  | ST |
| Example Layer 42 | ACP |
|  | ST |
| Example Layer 43 | ST |
|  | ACP |
| Example Layer 44 | ST |
|  | EVA |
| Example Layer 45 | EVA |
|  | ST |
| Example Layer 46 | ST |
|  | GR |
| Example Layer 47 | GR |
|  | ST |
| Example Layer 48 | ACP |
|  | EVA |
|  | ACP |
|  | ST |
|  | EVA |
|  | GR |
|  | ACP |
| Example Layer 49 | ST |
|  | EVA |
|  | GR |
|  | ACP |
| Example Layer 50 | ACP |
|  | ST |
|  | EVA |
| Example Layer 51 | AL |
| Example Layer 52 | AL |
|  | AL |
| Example Layer 53 | AL |
|  | GR |
|  | EVA |
|  | AL |
|  | GR |
|  | EVA |
|  | AL |
|  | EVA |
|  | AL |
|  | EVA |
|  | AL |
| Example Layer 54 | AL |
|  | GR |
| Example Layer 55 | GR |
|  | AL |
| Example Layer 56 | AL |
|  | EVA |
| Example Layer 57 | EVA |
|  | AL |
| Example Layer 58 | AL |
|  | ST |
| Example Layer 59 | ST |
|  | AL |
| Example Layer 60 | AL |
|  | GR |
|  | EVA |
| Example Layer 61 | stone material |
| Example Layer 62 | polymer material |
| Example Layer 63 | metal material |
| Example Layer 64 | metal material |
|  | stone material |
|  | polymer material |
| Example Layer 65 | metal material |
|  | stone material |
|  | polymer material |
|  | metal material |
|  | polymer material |
|  | metal material |
| Example Layer 66 | aluminum material |
|  | stone material |
|  | polymer material |
|  | ST |
|  | aluminum material |
|  | polymer material |
|  | aluminum material |
| Example Layer 67 | metal material |
|  | polymer material |
|  | metal material |
| Example Layer 68 | ACP |
|  | stone material |
|  | polymer material |
|  | ST |
|  | ACP |
| Example Layer 69 | aluminum material |
|  | EVA |
|  | aluminum material |
| Example Layer 70 | ST |
|  | aluminum material |

Example 2

Anti-Ballistic System Formed of ACP, EVA, and GR

The following Table 2 provides a non-limiting example of an anti-ballistic system according to some embodiments:

TABLE 2

| Layer | Material | Thickness |
|---|---|---|
| 1 | ACP | 4 mm |
|  | GR | 13 mm |
|  | EVA | 12 mm |
| 2 | ACP | 4 mm |
|  | GR | 13 mm |
|  | EVA | 12 mm |
| 3 | ACP | 4 mm |
|  | EVA | 22 mm |
| 4 | ACP | 4 mm |
|  | EVA | 8 mm |
| 5 | ACP | 4 mm |

Example 3

UL8 and ANSI/UL-752 Compliant Anti-Ballistic System

Ballistic resistance testing was performed on an anti-ballistic system configured as provided in Table 3:

TABLE 3

| Size | 12 × 12 inches |
|---|---|
| Average Thickness | 3.281 inches |
| Weight | 18.95 lbs |
| Layers | ACP (4 mm) |
|  | GR (18 mm) |
|  | EVA (25 mm) |

TABLE 3-continued

| |
|---|
| ST (3 mm) |
| ACP (4 mm) |
| EVA (25 mm) |
| ACP (4 mm) |

The ballistic resistance tests were performed according to the following standards: ANSI/UL 752-2005 and Non-Metallic, Protection Level 8 (7.62 mm M80, 2750-3025 feet per second (fps)). The ballistic resistance tests were configured according to the set-up provided in Table 4:

TABLE 4

| | |
|---|---|
| Shot Spacing | 4 on 4.5 inch$^2$, 1 in center |
| Witness Panel | 1/8 inch corrugated cardboard |
| Obliquity | 0° |
| Conditioning | Ambient (72° F.) |
| Primary Vel. Screens | 5.0 ft, 10.0 ft |
| Primary Vel. Location | 7.5 ft from muzzle |
| Range to Target | 15.0 ft |
| Target to Wit. | 18.0 in |
| Temperature | 72° F. |
| Barometric Pressure | 30.30 in Hg |
| Relative Humidity | 50% |
| Ammunition | 7.62 × 51 mm, M80, ball, 150 gr. |

The ballistic resistance tests on the ballistic system generated the results provided in Table 5:

TABLE 5

| Shot No. | Time 1 | Velocity 1 | Time 2 | Velocity 2 | Average Velocity (ft/s) | Penetration |
|---|---|---|---|---|---|---|
| 1 | 1735 | 2882 | 1736 | 2880 | 2881 | None |
| 2 | 1729 | 2892 | 1730 | 2890 | 2891 | None |
| 3 | 1757 | 2846 | 1757 | 2846 | 2846 | None |
| 4 | 1743 | 2869 | 1745 | 2865 | 2867 | None |
| 5 | 1757 | 2846 | 1759 | 2843 | 2844 | None |

The ballistic resistance tests demonstrated the surprising results that, among other things, an anti-ballistic system may be UL8 and ANSI/UL 752-2005 compliant using a lightweight and compact form factor formed from the materials and in the dimensions described according to some embodiments.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An anti-ballistic, anti-blast, and anti-forced entry system, comprising:
    a plurality of layers arranged in an order comprising:
        a first layer consisting of at least one aluminum composite material layer,
        wherein the first layer contacts a second layer consisting of at least one granite material layer;
        wherein the second layer further contacts a third layer consisting of at least one non-adhesive ethylene vinyl acetate material layer,
        wherein the third layer further contacts a fourth layer consisting of at least one steel material layer; and
        wherein the fourth layer further contacts a fifth layer consisting of at least one aluminum composite material layer;
    wherein each of the aluminum composite material layers in the first and fifth layers are formed from a second material arranged between two layers of aluminum.

2. The system of claim 1, wherein the third layer is at least 20 mm thick.

3. The system of claim 1, wherein each of the first and fifth layers comprise a plurality of aluminum composite material layers,
    wherein the third layer comprises a plurality of ethylene vinyl acetate material layers; and
    wherein the second layer comprises a plurality of granite layers.

4. The system of claim 1, wherein the third layer provides softening back pressure to adjacent materials impacted by a projectile.

5. The system of claim 1, wherein the at least one aluminum composite material layer in each of the first and fifth layers comprises a first aluminum composite material layer, a second aluminum composite material layer, and a third aluminum composite material layer,
    wherein the at least one non-adhesive ethylene vinyl acetate material layer in the third layer comprises a first ethylene vinyl acetate material layer and a second ethylene vinyl acetate material layer, and
    wherein the at least one granite layer in the second layer comprises a first granite material layer and a second granite material layer.

6. The system of claim 1, wherein each of the first and fifth layers have a thickness of about 3 millimeters to about 5 millimeters,
    wherein the third layer has a thickness of about 10 millimeters to about 25 millimeters, and
    wherein the second layer has a thickness of about 10 millimeters to about 15 millimeters.

7. The system of claim 1, wherein the anti-ballistic system is formed as a wall structure having a thickness of about 7.62 centimeters to about 10.16 centimeters, a height of about 2.44 meters to about 3.66 meters, and a width of about 0.91 meters to about 1.50 meters.

8. The system of claim 7, wherein the wall structure has a weight per area of about 73.2 kilograms per square meter to about 97.7 kilograms per square meter.

9. The system of claim 7, wherein the anti-ballistic system is ANSI/UL 752 Level 8 compliant.

10. An anti-ballistic system, comprising:
    a plurality of layers comprising:
        a first energy reducing layer consisting of at least one aluminum composite material layer,
        the first energy reducing layer contacting a second energy reducing layer consisting of at least one granite material layer;
        the second energy reducing layer further contacting a shock absorbing layer consisting of at least one non-adhesive ethylene vinyl acetate material layer,
        the shock absorbing layer further contacting a third energy reducing layer consisting of at least one steel material layer; and
        the third energy reducing layer further contacting a fourth energy reducing layer consisting of at least one aluminum composite material layer,
    wherein each of the aluminum composite material layers in the first and fourth energy reducing layers are formed from a second material arranged between two layers of aluminum;
    wherein the layers are held together using a fastening mechanism.

11. The system of claim 10, wherein the at least one aluminum composite material layer in each of the first and fourth energy reducing layers comprises a first aluminum composite material layer, a second aluminum composite material layer, and a third aluminum composite material layer,
    wherein the at least one non-adhesive ethylene vinyl acetate material layer comprises a first ethylene vinyl acetate non-adhesive material layer and a second ethylene vinyl acetate non-adhesive material layer, and
wherein the at least one granite material layer comprises a first granite material layer.

12. A method of making an anti-ballistic system, the method comprising:
   providing a plurality of layers comprising:
      a first layer consisting of at least one aluminum composite material layer,
      wherein the first layer contacts a second layer consisting of at least one granite material layer;
      wherein the second layer further contacts a third layer consisting of at least one non-adhesive ethylene vinyl acetate material layer, and
      wherein the third layer further contacts a fourth layer consisting of at least one steel material layer; and
      wherein the fourth layer further contacts a fifth layer consisting of at least one aluminum composite material layer;
      wherein each of the aluminum composite material layers In the first and fifth layers are formed from a second material arranged between two layers of aluminum.

13. The method of claim 12, wherein the at least one aluminum composite material layer in each of the first and fifth layers comprises a first aluminum composite material layer, a second aluminum composite material layer, and a third aluminum composite material layer,
   wherein the at least one non-adhesive ethylene vinyl acetate material layer in the third layer comprises a first ethylene vinyl acetate material layer and a second ethylene vinyl acetate material layer, and
   wherein the at least one granite layer in the second layer comprises a first granite material layer and a second granite material layer.

* * * * *